United States Patent
Potier et al.

(10) Patent No.: US 12,422,001 B2
(45) Date of Patent: Sep. 23, 2025

(54) ASYMMETRIC MECHANICAL TORQUE LIMITER

(71) Applicant: Goodrich Actuation Systems SAS, Saint-Marcel (FR)

(72) Inventors: Karl Potier, Paris (FR); Maxime Serrand, Paris (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 348 days.

(21) Appl. No.: 18/303,155

(22) Filed: Apr. 19, 2023

(65) Prior Publication Data

US 2023/0341003 A1  Oct. 26, 2023

(30) Foreign Application Priority Data

Apr. 21, 2022 (EP) .................................... 22305598

(51) Int. Cl.
*F16D 7/00* (2006.01)
*B64C 13/28* (2006.01)

(52) U.S. Cl.
CPC .............. *F16D 7/007* (2013.01); *B64C 13/28* (2013.01)

(58) Field of Classification Search
CPC ......... B64C 13/28; F16D 7/005; F16D 7/007; F16D 7/024; F16D 7/025; F16D 43/213; F16D 43/215

(Continued)

(56) References Cited

U.S. PATENT DOCUMENTS

| 4,850,458 A | * | 7/1989 | Allan | F16D 7/007 |
| | | | | 192/223 |
| 5,855,518 A | * | 1/1999 | Tanaka | F16D 3/66 |
| | | | | 464/38 |

(Continued)

FOREIGN PATENT DOCUMENTS

| AT | 212648 B | 12/1960 |
| CN | 206582065 U | 10/2017 |

(Continued)

OTHER PUBLICATIONS

Abstract for CN206582065 (U), Published: Oct. 24, 2017, 1 page.

(Continued)

*Primary Examiner* — Josh Skroupa
(74) *Attorney, Agent, or Firm* — CANTOR COLBURN LLP

(57) ABSTRACT

An asymmetric torque limiter having an axis of rotation including a first annular friction disk, a second annular friction disk a skewed roller disk a first resilient member and a second resilient member. The second annular friction disk is concentrically arranged with the first annular friction disk. The skewed roller disk is in contact with the second annular friction disk. The skewed roller disk includes a plurality of skewed rollers mounted in an annular retainer. The plurality of skewed rollers are about a respective roller axis, each roller axis being skewed to a radial direction passing through the skewed roller from the axis of rotation. The first resilient member is attached to the first annular friction disk and is configured to bias the first annular friction disk toward an input shaft. The second resilient member is configured to bias the skewed roller disk toward the second annular friction disk.

15 Claims, 4 Drawing Sheets

(58) Field of Classification Search
USPC .................................. 464/30, 34–38, 45–47
See application file for complete search history.

(56) References Cited

U.S. PATENT DOCUMENTS

| | | | | |
|---|---|---|---|---|
| 6,312,339 | B1 * | 11/2001 | Beyert | ...................... F16D 7/08 |
| | | | | 464/36 |
| 6,824,099 | B1 | 11/2004 | Jones | |
| 6,997,297 | B2 * | 2/2006 | Bartley | ................... F16D 63/00 |
| | | | | 192/45.006 |
| 7,143,888 | B2 | 12/2006 | Lang | |
| 8,206,226 | B2 * | 6/2012 | Kampf | ...................... F16D 7/08 |
| | | | | 464/36 |
| 9,810,261 | B1 * | 11/2017 | Gavriliuc | ................. F16D 7/007 |
| 10,520,070 | B2 | 12/2019 | Turpin et al. | |
| 10,598,265 | B2 | 3/2020 | Seminel et al. | |
| 2024/0167520 | A1 * | 5/2024 | Potier | .................... F16D 7/027 |

FOREIGN PATENT DOCUMENTS

| | | | | | |
|---|---|---|---|---|---|
| DE | 430562 | C | * | 6/1926 | ........... F16D 43/213 |
| DE | 1211874 | B | * | 3/1966 | ........... F16D 43/213 |
| DE | 1220211 | B | * | 6/1966 | ............. F16D 7/007 |
| DE | 102006008592 | A1 | | 9/2007 | |
| WO | 2013162734 | A1 | | 10/2013 | |

OTHER PUBLICATIONS

Abstract for DE102006008592 (A1); Published: Sep. 13, 2007, 1 page.
European Search Report for Application No. 22305598.9, mailed Oct. 20, 2022, 5 pages.

* cited by examiner

ASYMMETRIC MECHANICAL TORQUE LIMITER

CROSS-REFERENCE TO RELATED APPLICATIONS

This application claims priority to European Patent Application No. 22305598.9 filed Apr. 21, 2022, the entire contents of which is incorporated herein by reference.

TECHNICAL FIELD

The present disclosure relates to torque limiters and in particular an asymmetric torque limiter.

BACKGROUND

A torque limiter is a device that provides a limit to the torque that can be transmitted by a connection, for example between an input and an output shaft. This limiting of the transmissible torque through the connection is able to protect components either comprised by or connected to the connection from mechanical overload and thereby reduce the chance of damage incurred by the overload.

In certain applications, a torque limiter may be used to limit torque in both directions of torque, that is, in both a clockwise and an anticlockwise direction. Of those applications, the transmissible torque limit may be different in each rotational direction.

An asymmetric torque limiter is a torque limiter with a different transmissible torque limit in each torque direction. For example, the torque that can be transmitted through the asymmetric torque limiter may be higher in a clockwise direction than in an anticlockwise direction.

Asymmetric torque limiters may be used in a variety of applications. One such application is in the actuation of flight control surfaces (such as flaps, slats, spoilers, ailerons, and/or spoilerons) on an aircraft, for example on a wing of the aircraft. The flight control surfaces, and their actuators in turn, experience differing loads during extension (or deployment) and retraction due to the airflow interacting with the flight control surface. Greater torque is required to extend or deploy the flight control surface than to retract the flight control surface. There is therefore a requirement for a higher transmissible torque limit in the direction which deploys the flight control surface than the transmissible torque limit in the direction which retracts the flight control surface.

In previous systems active torque limit control, for example by electronically limiting the torque in each direction, has been used. However, there is a desire for a passive, mechanical, asymmetric torque limiter, to avoid dependence on electronic controls, for example to mitigate risk arising in the event of electronic failure.

There is also a desire to provide a compact and light asymmetric torque limiter.

There is a desire for a passive asymmetric torque limiter having a different torque limit in each of a clockwise and anti-clockwise direction.

While described in the context of aircraft flight control surfaces, it is noted that the presently described asymmetric torque limiter will be useful in a variety of applications.

SUMMARY

According to one aspect of the present disclosure, there is provided an asymmetric torque limiter having an axis of rotation including a first annular friction disk, a second annular friction disk, a skewed roller disk, a first resilient member and a second resilient member. The second annular friction disk is concentrically arranged with the first annular friction disk. The skewed roller disk is in contact with the second annular friction disk. The skewed roller disk includes a plurality of skewed rollers mounted in an annular retainer. The plurality of skewed rollers are each rotatable about a respective roller axis, each roller axis being skewed with respect to a radial direction passing through the skewed roller from the axis of rotation. The first resilient member is attached to the first annular friction disk and is configured to bias the first annular friction disk toward an input shaft. The second resilient member is configured to bias the skewed roller disk toward the second annular friction disk.

In some examples in accordance with the above, the asymmetric torque limiter may include an annular spacer mounted between the second resilient member and the skewed roller disk. The annular spacer is in contact with the skewed roller disk.

In some examples in accordance with any of the above, the second annular friction disk is arranged radially outwardly of first annular friction disk.

In some examples in accordance with any of the above, the second annular friction disk is arranged radially inwardly of the first annular friction disk.

In some examples in accordance with any of the above, the first resilient member includes a Belleville spring.

In some examples in accordance with any of the above, the second resilient member includes a Belleville spring.

In some examples in accordance with any of the above, each of the first and the second annular friction disks are carbon friction disks.

In some examples in accordance with any of the above, each roller axis is skewed at an angle of 45 degrees with respect to the radial direction passing through the skewed roller from the axis of rotation (A).

There is also provided an assembly including an input shaft, an output shaft coaxial with the input shaft and an asymmetric torque limiter in accordance with any of the above mounted axially between the input shaft and the output shaft.

In some examples in accordance with the above, the output shaft includes an outer circumferential ring located radially outwardly of the skewed roller disk.

In some examples in accordance with any of the above, the assembly includes a static body and a thrust bearing mounted axially between a portion of the static body and a portion of the input shaft.

There is also provided an aircraft wing including a flight control surface and the assembly of any of the above. The output shaft is configured to actuate the flight control surface.

There is also provided an aircraft including the aircraft wing of the above.

There is also provided a method of passively limiting torque asymmetrically using the asymmetric torque limiter of any of the above. The method includes: providing an input shaft with a first input torque in one of a clockwise and anticlockwise direction and transmitting the first input torque from the input shaft to an output shaft when the first input torque is less than a first torque threshold and preventing transmission of torque higher than the first torque threshold when the first input torque is greater than the first torque threshold; and providing the input shaft with a second input torque in the other of the clockwise and anticlockwise direction and transmitting the second input torque from the input shaft to the output shaft when the second input torque is less than a second torque threshold and preventing transmission of torque higher than the second torque threshold when the second input torque is greater than the second torque threshold. The second torque threshold is larger than the first torque threshold.

There is also provided a method of controlling a flight control surface on an aircraft wing including the method above, wherein providing the input shaft with the second input torque deploys the flight control surface and providing the input shaft with the first input torque retracts the flight control surface.

The features of the above aspects and examples may be used in any combination.

These and other features disclosed herein can be best understood from the following specification and drawings, the following of which is a brief description.

BRIEF DESCRIPTION OF DRAWINGS

Various embodiments of this disclosure will now be described by way of example only, with reference to the accompanying drawings in which.

DETAILED DESCRIPTION OF DRAWINGS

Figure 1:
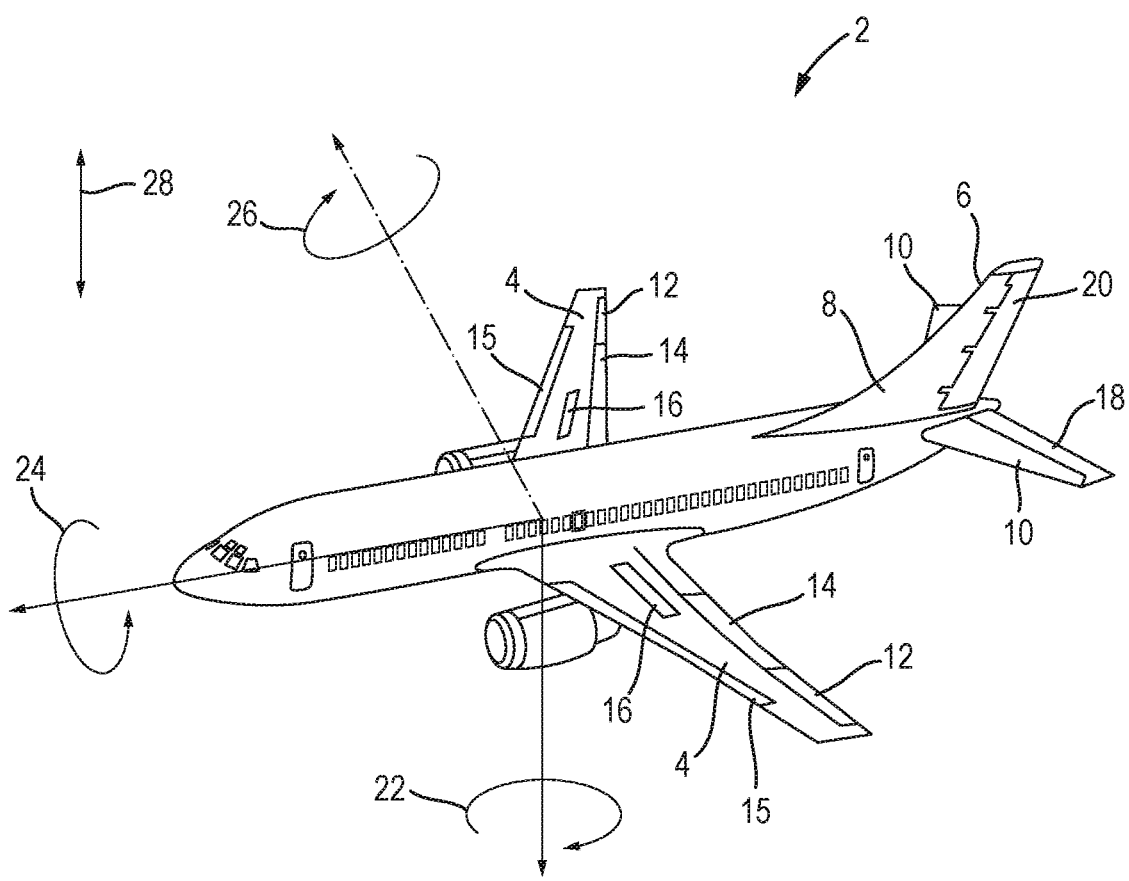
FIG. 1 shows an aircraft in which the torque limiter may be used.

With reference to FIG. 1, there is described an aircraft 2 in which the asymmetric torque limiter is used. The aircraft 2 includes wings 4 and a tail assembly 6 including a vertical stabiliser 8 and horizontal stabilisers 10.

The illustrated wings 4 and the tail assembly 6 include flight control surfaces 12, 14, 15, 16, 18, 20 which include ailerons 12, flaps 14, slats 15, spoilers 16, elevators 18 and a rudder 20.

Together, these flight control surfaces 12-20 are extended (or deployed), retracted and adjusted as appropriate to control the yaw 22, the roll 24, the pitch 26, and the lift 28 of the aircraft 2 when in flight by the interaction of the flight control surfaces 12-20 with the airflow.

The flight control surfaces 12-20 are controlled by the action of respective actuators, which include of a motor and a gearbox. These actuators provide rotary motion as their output, which is connected to the respective flight control surface 12-20. These actuators may be suitable for use on thin wing configurations.

There is a requirement to limit the amount of torque transmitted from the actuator to the flight control surfaces 12-20 in order to avoid mechanical overload from an input shaft working against the airflow interacting with the flight control surface 12-20. For this reason, a torque limiter is provided on the input of each flight control surface 12-20. The torque limit required is different for the extension (or deployment) of the flight control surface 12-20 and the retraction of the flight control surface 12-20. The torque required to extend (or deploy) the flight control surface 12-20 is greater than the torque required to retract the flight control surface 12-20, and thus an asymmetric torque limiter is required.

The asymmetric torque limiter allows torque to be transmitted therethrough when the input torque is below a threshold torque.

The threshold torque in the extension direction is greater than the threshold torque in the retraction direction. In this way, the asymmetric torque limiter allows the transmission of a greater torque in the extension direction than in the retraction direction. The extension direction corresponds to one of a clockwise and anti-clockwise direction and the retraction direction corresponds to the other of the clockwise and anticlockwise direction of input torque, depending on the configuration of the actuator.

An asymmetric torque limiter 30 is described below with reference to FIG. 2.

The illustrated asymmetric torque limiter 30 is provided between an input shaft 32 and an output shaft 34. The input shaft 32 and output shaft 34 are arranged coaxially on an axis of rotation A. The output shaft 34 is located in a distal direction with respect to the input shaft 32.

The input shaft 32 is supported by a stationary casing 36 (or a body) by means of thrust bearings 38. The thrust bearings 38 are located axially between a portion of the casing 36 and a portion 40 of the input shaft 32. The portion 40 of the input shaft 32 is a radially extending flange 40 at a distal end of the input shaft 32. The thrust bearings 38 may have any appropriate construction, such as roller bearings supported by distal and proximal races attached to the portion 40 of the input shaft 32 and the portion of the casing 36 respectively. Alternative thrust bearings may be used, such as a three-part ball thrust bearing. The thrust bearing 38 allows the input shaft 32 to rotate with minimal friction with respect to the casing 36 and supports a predominantly axial load between the input shaft 34 and the casing 36.

The asymmetric torque limiter 30 includes a first annular friction disk 42 located between the input shaft 32 and the output shaft 34. The first annular friction disk 42 is arranged coaxially about the axis of rotation A. The first annular friction disk 42 in some embodiments is a carbon friction disk; however, other materials may be used for the first annular friction disk 42. The first annular friction disk 42 acts as a symmetrical torque limiter in that it provides a torque threshold (the first individual torque threshold described below) that is the same in each of a clockwise direction and an anti-clockwise direction.

In one embodiment, the first annular friction disk 42 is mounted to a first resilient member 44, and biased by the first resilient member 44 toward the input shaft 32 to be in contact therewith. The first resilient member is mounted to the output shaft 34. The first resilient member 44 may be a spring, for example a Belleville spring 44 (which is a plurality of stacked Belleville washers, or stacked coned-disc springs). The illustrated first resilient member 44 is coaxial to the axis of rotation A.

The first annular friction disk 42 and the first resilient member 44 have characteristics that allow a torque to be transmitted from the input shaft 32, through the first annular friction disk 42 and first resilient member 44 to the output shaft 34, when the torque is below a first individual torque threshold. The first individual torque threshold is the same in both the clockwise and anticlockwise directions. Above the first individual torque threshold, the surface of the input shaft 32 in contact with the first annular friction disk 42 will slip such that any excess torque above the first individual torque threshold will not be transmitted. Those characteristics that set the first individual torque threshold include: an inner radius R1 of the annular friction disk 42; an outer radius R2 of the annular friction disk 42, a spring load, and a friction coefficient between the material of the first annular friction disk 42 and that of the input shaft 32.

The friction coefficient may be from 0.05 to 0.2, or more particularly about 0.1. The spring load may be 2000-4000 N, or more particularly about 2800 N. The inner radius R1 may be from 1 mm to 10 mm, or more particularly about 5 mm. The outer radius R2 may be from 10 mm to 60 mm, or more particularly about 30 mm. The first individual torque threshold may be from 2 Nm to 8 Nm, or more particularly about 4.9 Nm.

For alternative applications where different torque thresholds are required, these characteristics can be different to those listed above.

Taken in isolation (for example if the second annular friction disk and skewed roller disk described below were removed), the first annular friction disk 42 would allow torque in both clockwise and anticlockwise directions to be transmitted therethrough from the input shaft 32 to the output shaft 34 when the torque input to the input shaft 32 is below the first individual torque threshold and prevent any further torque being transmitted when the torque input to the input shaft 32 is above the first individual torque threshold. When the torque input to the input shaft 32 is above the first individual torque threshold, the input shaft 32 will slip with respect to the first annular friction disk 42 and thereby rotate without transmitting all of the input torque.

The asymmetric torque limiter 30 also includes a second annular friction disk 46 located between the input shaft 32 and the output shaft 34. The second annular friction disk 46 is arranged coaxially about the axis of rotation A. The illustrated second annular friction disk 46 is located radially outwards of the first annular friction disk 42. The second annular friction disk 46 in some embodiments is a carbon friction disk; however, other materials may be used for the second annular friction disk 46.

Axially adjacent (with respect to the rotational axis A) to the second annular friction disk 46 is a skewed roller disk 48, distal of the second annular friction disk 46. The skewed roller disk 48 includes an annular retainer 50 and a plurality of skewed rollers 52. As can be appreciated from FIG. 3, the skewed rollers 52 are mounted in the annular retainer 50 in a manner such that each skewed roller 52 may freely rotate about a respective roller axis 54. As shown, each respective roller axis 54 is arranged at an angle α with respect to a radial direction 56 of the skewed roller disk 48 extending through the centre of the respective skewed roller 52. The angle a may be called a skew angle or a tilt angle. The angle α is an acute angle. In some embodiments the angle α is between 20 and 70 degrees, or, more particularly, between 30 and 60 degrees, or about 45 degrees.

With reference again to FIG. 2, axially adjacent (with respect to the rotational axis A) to the skewed rollers 52 is a spacer 58. The spacer 58 is distal of and in contact with the skewed rollers 52. The spacer 58 is coaxially arranged about the rotational axis A.

A second resilient member 60 is arranged axially adjacent the spacer 58. The second resilient member 60 is mounted to the output shaft 34 and biases the spacer 58 and the skewed roller disk 48 toward the second annular friction disk 46. Due to the action of the second resilient member 60 both the spacer 58 and the second annular friction disk 46 are maintained in contact with the skewed rollers 52. The second resilient member 60 may be a spring, for example a Belleville spring 60 (which is a plurality of stacked Belleville washers, or stacked coned-disc springs). The illustrated second resilient member 60 is coaxial with the rotational axis A and is arranged concentrically with the first resilient member 44.

The illustrated output shaft 34 includes an outer circumferential ring 66 located radially outwardly of the skewed roller disk 48. The outer circumferential ring 66 maintains the skewed roller disk 48, the spacer 58 and the second resilient member 60 in its coaxial position about the rotation axis A.

Taken in isolation (that is, if the first annular friction disk 42 were removed), the second annular friction disk 46, the skewed roller disk 48, the spacer 58 and the second resilient member 60 allow the transmission of torque in a single direction below a second individual torque threshold.

Figure 3:
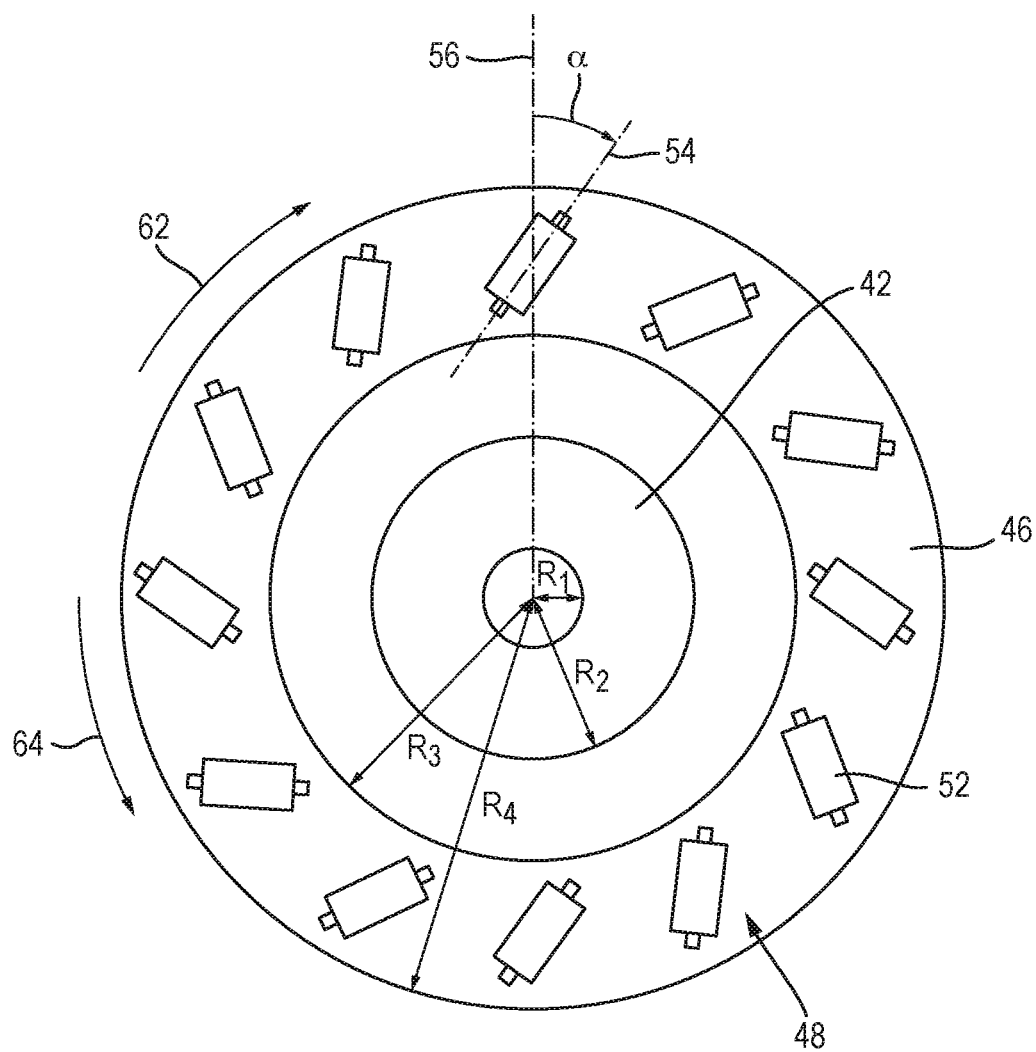
FIG. 3 shows an axial view of the skewed roller device and the first and second annular friction disks of the torque limiter of FIG. 2.

Considering FIG. 3, when the input shaft 32 rotates in a clockwise direction 62 with respect to the skewed roller disk 48 (which is equivalent to the skewed roller disk 48 rotating in an anticlockwise direction 64 in the frame of reference of the input shaft 32), the skewed rollers 52 are not able to freely rotate about their roller axes 54. If the input torque is below a second individual torque threshold, the second annular friction disk 46 will frictionally engage the skewed rollers 52 to drive rotation of the skewed roller disk 48. The skewed roller disk 48 will in turn frictionally engage and drive rotation of the spacer 58 and thus ultimately drive rotation of the output shaft 34. If the input torque is above the second individual torque threshold, the second annular friction disk 46 will slip in the clockwise direction with respect to the skewed roller disk 48, and/or the skewed roller disk 48 will slip in the clockwise direction with respect to the spacer 58. In this case, the input shaft 32 will thereby rotate freely without transmitting all of the input torque. In this torque direction the skewed roller disk 48 is said to be in a sliding condition.

When the input shaft 32 rotates in an anti-clockwise rotation 64 with respect to the skewed roller disk 48, the skewed rollers 52 are able to rotate about their roller axes 54 and thereby allow the input shaft 32 to rotate with minimal friction and thereby without driving the skewed roller disk 48 or the spacer 58 and thus the output shaft 34. In this situation the skewed roller disk 48 is said to be in a rolling condition.

As will be appreciated, if the direction of the skew of the skewed rollers 52 is reversed, then the directions in which free rotation and torque limited transmission is allowed are also reversed.

The second individual torque threshold is determined by certain characteristics of the second annular friction disk 46, the skewed roller disk 48 and the second resilient member 60. Those characteristics include: an inner radius R3 of the second annular friction disk 46; an outer radius R4 of the second annular friction disk 46, a spring load, a friction coefficient between the material of the second annular friction disk 46 and that of the skewed rollers 46, and the skew angle α of the skewed rollers 46.

The friction coefficient may be from 0.05 to 0.2, or more particularly about 0.1. The spring load may be 2000-4000 N, or more particularly about 2800 N. The inner radius R3 may be from 20 mm to 60 mm, or more particularly about 40 mm. The outer radius R4 may be from 40 mm to 80 mm, or more particularly about 52.5 mm. The second individual torque threshold may be from 8 Nm to 20 Nm, or more particularly about 12.95 Nm.

For alternative applications where different torque thresholds are required, these characteristics can be different to those listed above.

When the first annular friction disk 42 is used in combination with the second annular friction disk 46 and the skewed roller disk 48 in the asymmetric torque limiter described herein, two load paths are provided between the input shaft 32 and the output shaft 34. The first load path is through the first annular friction disk 42 and the first resilient member 44 and the second load path is through the second annular friction disk 46, the skewed roller disk 48, the spacer 58 and the second resilient member 60.

In a first direction of torque applied by the input shaft 32 (the clockwise direction 62 as described above, wherein the skewed roller disk 48 is in the sliding condition) a first combined torque threshold (or a first torque threshold) below which all of the torque is transmitted to the output shaft 34 is the sum of the first individual torque threshold and the second individual torque threshold. In a second direction of torque applied to the input shaft 32 opposite the first direction (the anticlockwise direction 64 as described above, wherein the skewed roller disk 48 is in the rolling condition) a second combined torque threshold (or a second torque threshold) below which torque is transmitted to the output shaft 34 is equal to the first individual torque threshold. Accordingly, the first combined torque threshold is higher than the second combined torque threshold. This means that higher torque can be transmitted in the first (or clockwise) direction 62 than in the second (or anticlockwise) direction 64.

For example, when the first individual torque threshold is 4.9 Nm and the second individual torque threshold is 12.95 Nm, as in the examples above, the first combined torque threshold is 17.85 Nm and the second combined torque threshold is 4.9 Nm.

When used in an aircraft, the first direction 62 (with its higher torque threshold) is used for extension of the aircraft flight control surface 12-20 and the second direction 64 (with its lower torque threshold) is used for retraction of the aircraft flight control surface 12-20.

It will be appreciated that when the skewed roller disk 48 is in the rolling condition, which is when the second (or anticlockwise) direction of torque is applied to the input shaft 32, the rolling of the skewed rollers 52 may provide a small amount of friction such that the second combined torque threshold (or second torque threshold) is slightly higher than the first individual torque threshold, for example by up to about 10%. In this manner, when the second direction of torque is applied to the input shaft 32 the first annular friction disk 42 still accounts for 90% or more of the second combined torque threshold (or the global retraction torque threshold).

In this way, the asymmetric torque limiter provides a passive means to limit the torque transmissible in each direction of the torque input from the input shaft 32 at different torque limits.

Figure 4:
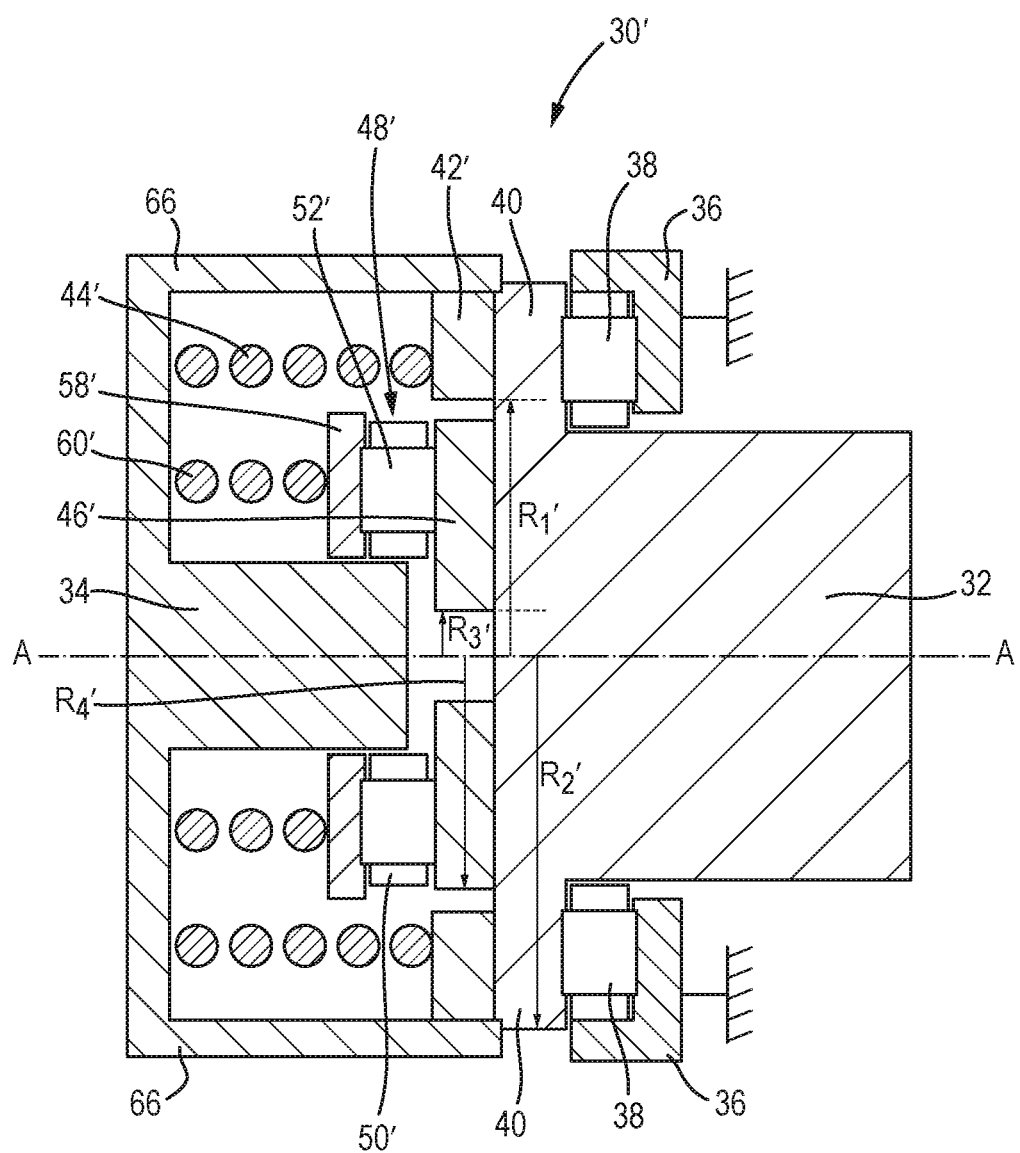
FIG. 4 shows a cross-sectional schematic view of an asymmetric torque limiter according to another embodiment.

An alternative embodiment of an asymmetric torque limiter 30' is illustrated in FIG. 4. Like reference numerals have been used for similar elements, and unless described otherwise below, the elements of FIG. 4 share the same characteristics as those of FIG. 2.

Figure 2:
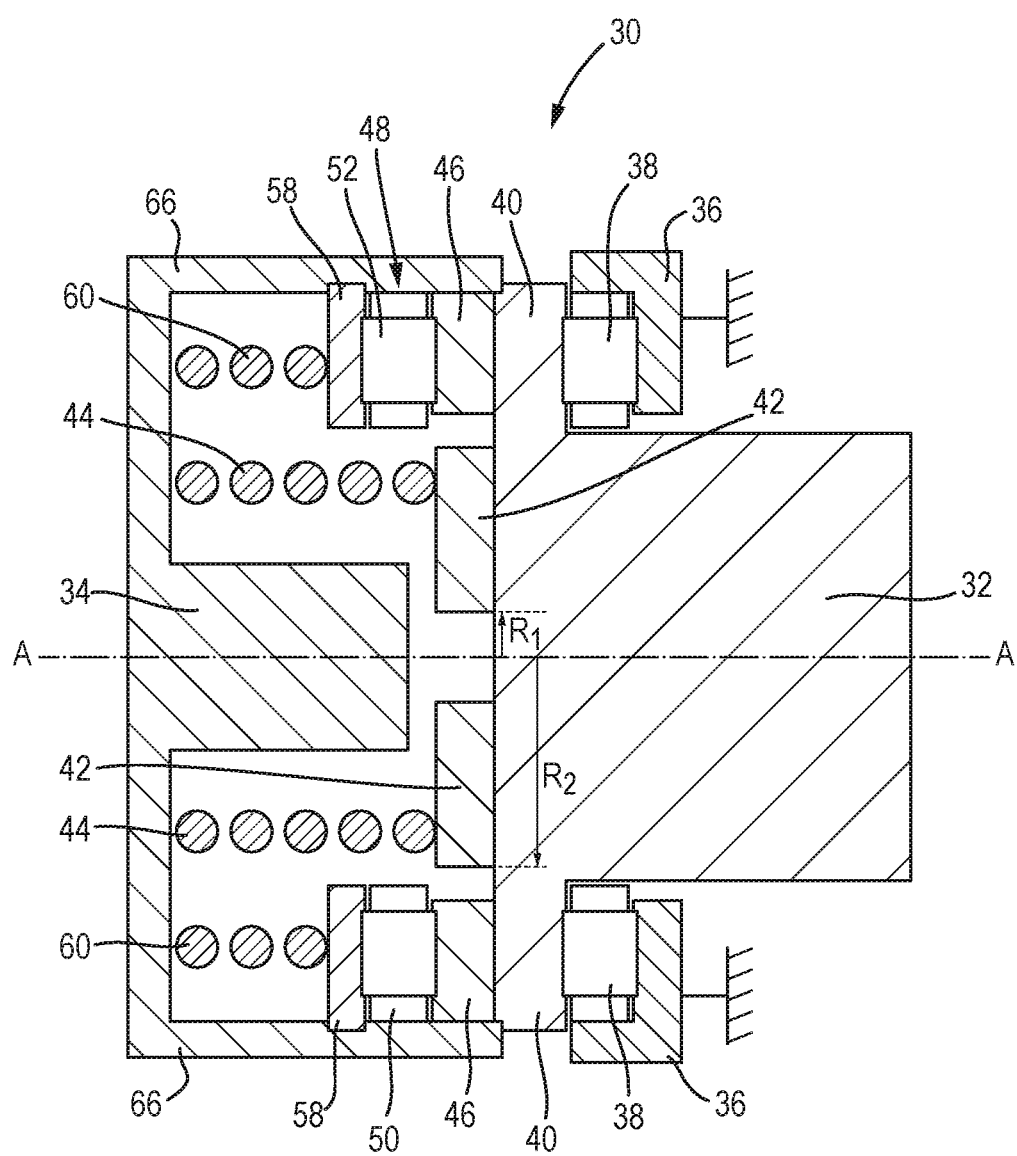
FIG. 2 shows a cross-sectional schematic view of an asymmetric torque limiter according to one embodiment.

The embodiment of FIG. 4 differs from that of FIG. 2 in that the first annular friction disk 42' and first resilient member 44' are radially outwardly located of the second annular friction disk 46', the skewed roller disk 48', the spacer 58' and the second resilient member 60' (i.e., they have swapped positions).

The inner radius R1' and the outer radius R2' of the first annular friction disk 42' are therefore larger in the FIG. 4 embodiment. For example, the inner radius R1' may be between 20 mm and 60 mm, or more particularly about 40 mm, and the outer radius R2' may be between 60 mm and 80 mm, or more particularly about 52.5 mm. The inner radius R3' and the outer radius R4' of the second annular friction disk 46' will likewise be smaller in the FIG. 4 embodiment. For example, the inner radius R3 may be from 1 mm to 10 mm, or more particularly about 5 mm and the outer radius R4 may be from 10 mm to 60 mm, or more particularly about 30 mm.

The first resilient member 44' shown in FIG. 4 is still associated with the first annular friction disk 42' in the same manner as described with reference to FIG. 2 and is accordingly larger than the first resilient member 44 shown in FIG. 2.

In the embodiment of FIG. 4, the skewed roller disk 48', skewed rollers 52', retainer 50', spacer 58' and second resilient member 60' are still associated with the second annular friction disk 46' in the same manner as described with reference to FIG. 2. Each of the skewed roller disk 48', skewed rollers 52', retainer 50', spacer 58' and second resilient member 60' are therefore smaller than their equivalent components from FIG. 2. Each of the skewed roller disk 48', skewed rollers 52', retainer 50', spacer 58' and second resilient member 60' are arranged radially inwardly of the first resilient member 44'.

In the embodiment of FIG. 4, the first individual torque threshold will be higher than the embodiment of FIG. 2 and the second individual torque threshold will be lower than the embodiment of FIG. 2. As a result, there will be a smaller difference between the first and second combined torque thresholds. This is because the skewed roller disk 48', which provides the asymmetric character of the torque limiter, by being positioned inside the first annular friction disk 42', will provide a smaller proportion of the first combined torque threshold (that is, the torque threshold where the skewed roller disk 48' is in its sliding condition).

In alternative embodiments, the second annular friction disk 46, 46' and the spacer 58, 58' could swap positions, such that the spacer 58, 58' is mounted to the input shaft 32 and the second annular friction disk 46, 46' is mounted to the second resilient member 60, 60'.

The torque limiting function (described above) is achieved in the same manner in each of these embodiments by the skewed roller disk 48, 48' slipping with respect to the second annular friction disk 46, 46' and/or the spacer 58, 58' when a torque exceeding the second individual torque threshold in the clockwise direction 62 is provided to the input shaft 32. In each of these embodiments, the second annular friction disk 46, 46' may be misaligned axially with the first annular friction disk 42, 42'.

It will be appreciated that the above description is of a number of embodiments and that modifications may be made to those embodiments without departing from the scope of the disclosure.

The invention claimed is:

1. An asymmetric torque limiter having an axis of rotation (A) comprising:
   a first annular friction disk;
   a second annular friction disk concentrically arranged with the first annular friction disk;
   a skewed roller disk in contact with the second annular friction disk, wherein the skewed roller disk includes a plurality of skewed rollers mounted in an annular retainer, wherein the plurality of skewed rollers are each rotatable about a respective roller axis, each roller axis being skewed with respect to a radial direction passing through the skewed roller from the axis of rotation (A);

a first resilient member attached to the first annular friction disk and configured to bias the first annular friction disk toward an input shaft; and a second resilient member configured to bias the skewed roller disk toward the second annular friction disk.

2. The asymmetric torque limiter of claim 1, comprising an annular spacer mounted between the second resilient member and the skewed roller disk, wherein the annular spacer is in contact with the skewed roller disk.

3. The asymmetric torque limiter of claim 1, wherein the second annular friction disk is arranged radially outwardly of first annular friction disk.

4. The asymmetric torque limiter of claim 1, wherein the second annular friction disk is arranged radially inwardly of the first annular friction disk.

5. The asymmetric torque limiter of claim 1, wherein the first resilient member comprises a Belleville spring.

6. The asymmetric torque limiter of claim 1, wherein the second resilient member comprises a Belleville spring.

7. The asymmetric torque limiter of claim 1, wherein each of the first and the second annular friction disks are carbon friction disks.

8. The asymmetric torque limiter of claim 1, wherein each roller axis is skewed at an angle ($\alpha$) of 45 degrees with respect to the radial direction passing through the skewed roller from the axis of rotation (A).

9. An assembly, comprising:

an input shaft;

an output shaft coaxial with the input shaft; and an asymmetric torque limiter as recited in claim 1 mounted axially between the input shaft and the output shaft.

10. The assembly of claim 9, wherein the output shaft comprises an outer circumferential ring located radially outwardly of the skewed roller disk.

11. The assembly of claim 9, comprising:

a static body;

a thrust bearing mounted axially between a portion of the static body and a portion of the input shaft.

12. An aircraft wing comprising:

a flight control surface; and the assembly of claim 9, wherein the output shaft is configured to actuate the flight control surface.

13. An aircraft comprising the aircraft wing of claim 12.

14. A method of passively limiting torque asymmetrically using the asymmetric torque limiter of claim 1, the method comprising:

providing an input shaft with a first input torque in one of a clockwise and anticlockwise direction and transmitting the first input torque from the input shaft to an output shaft when the first input torque is less than a first torque threshold and preventing transmission of torque higher than the first torque threshold when the first input torque is greater than the first torque threshold; and providing the input shaft with a second input torque in the other of the clockwise and anticlockwise direction and transmitting the second input torque from the input shaft to the output shaft when the second input torque is less than a second torque threshold and preventing transmission of torque higher than the second torque threshold when the second input torque is greater than the second torque threshold, wherein the second torque threshold is larger than the first torque threshold.

15. The method of claim 14, wherein providing the input shaft with the second input torque deploys a flight control surface and providing the input shaft with the first input torque retracts the flight control surface.

\* \* \* \* \*